United States Patent [19]

Harrer

[11] Patent Number: 5,209,320
[45] Date of Patent: May 11, 1993

[54] OFFROAD AGRICULTURAL VEHICLE WITH ARTICULATED STEERING

[76] Inventor: Jerry A. Harrer, 2157 Carey Rd., Bloomvile, Ohio 44818

[21] Appl. No.: 645,419

[22] Filed: Jan. 24, 1991

[51] Int. Cl.⁵ .............................................. B62D 13/00
[52] U.S. Cl. .................................... 180/235; 180/134; 280/442
[58] Field of Search ............... 180/134, 148, 135, 151, 180/900, 235; 280/442, 444, 488, 492, 479.3, 400

[56] References Cited

U.S. PATENT DOCUMENTS

| | | | |
|---|---|---|---|
| 449,980 | 4/1891 | Thurman | 280/419 |
| 1,373,981 | 4/1921 | Smith | 180/235 |
| 1,761,669 | 6/1930 | Howard | 180/235 |
| 1,841,619 | 1/1932 | Maines | 280/444 |
| 2,349,141 | 5/1944 | Champion | 180/235 |
| 2,426,652 | 9/1947 | Storey | 180/134 |
| 2,673,616 | 3/1954 | Moores | 180/237 |
| 3,529,690 | 9/1970 | Mathew | 180/139 |
| 4,444,409 | 4/1984 | Garrison | 280/492 |
| 4,662,472 | 5/1987 | Christianson et al. | 180/235 |

FOREIGN PATENT DOCUMENTS

| | | | |
|---|---|---|---|
| 1044472 | 11/1953 | France | 280/442 |
| 0631950 | 1/1962 | Italy | 280/442 |
| 0761431 | 11/1956 | United Kingdom | 180/235 |

Primary Examiner—Margaret A. Focarino
Assistant Examiner—Anne Marie Boehler
Attorney, Agent, or Firm—Bradford E. Kile

[57] ABSTRACT

An offroad agricultural vehicle of the type operable to be used as a crop pesticide sprayer, fertilizer distributor and the like including a first frame having at least one load bearing ground engaging wheel and at least one wheel having an axis of rotation substantially parallel to a ground surface, a second frame having at least one load bearing ground engaging wheel and at least one wheel having an axis of rotation substantially parallel to a ground engaging surface, a drive which operably effects rotation of at least one of the load bearing ground engaging wheels, a universal pivot bearing positioned between a juncture of the first and second frames which permits relative pivoting motion between the first and second frame, a steering element including an arcuate rack, a pinion gear and an element for maintaining engagement of the pinion gear with the arcuate rack and an element for driving the pinion gear in opposite directions to impart lateral movement of the first frame with respect to the second frame.

11 Claims, 4 Drawing Sheets

OFFROAD AGRICULTURAL VEHICLE WITH ARTICULATED STEERING

BACKGROUND OF THE INVENTION

This invention relates to a novel offroad agricultural vehicle. More specifically, this invention relates to an offroad agricultural vehicle with articulated steering to be used as a crop pesticide sprayer, fertilizer applicator, and the like.

Across the United States and throughout the world, offroad agricultural vehicles are used to spray pesticide, apply fertilizer, and perform countless other functions. These vehicles must be extremely versatile and well suited for use within often harsh agricultural environments and uneven terrain.

In the agricultural field, it is sometimes desirable to utilize a vehicle wherein the front and rear wheels of the vehicle traverse coincident paths. In order to simplify vehicle design and minimize cost, the wheels of such a vehicle are restrained from pivoting about the wheel axle. When a change of direction is desired, front and rear frames of the vehicle pivot relative to each other to effectively steer the vehicle. While the basic concept of a vehicle with articulation steering has been known, many unresolved disadvantages have been occasioned in the past.

One of the first articulation steering machines was a tractor having two frames which articulate about a universal joint. A rack and pinion gear of crude design were provided as part of a steering assembly. The pinion gear moved along the rack and pivoted to translate an operator's steering signal to a corresponding pivoting of the two frames, thereby effecting steering.

One disadvantage to this configuration was the limitation on load capacity due to the single universal joint. Because the force of the load is delivered to the single universal joint, the friction force tends to bind the shaft housings of the two frames together and thereby decrease the ease of rotation of the two frames relative to one another. Moreover, such previously known vehicle frames were not sufficiently strong to support the weight of tanks which are presently used to carry insecticide, fertilizer, or the like. A further disadvantage to the above described vehicle was that steering effected by movement of the pinion along the rack adds another pivot point to the vehicle. The vehicle steering is therefore rather complex which then complicates operation of the vehicle. Still further, the steering ability of the vehicle is adversely affected when traversing uneven ground because engagement of the rack and pinion device may be disrupted as the two frames oscillate over an undulating terrain.

The difficulties suggested in the preceding are not intended to be exhaustive but rather are among many which may tend to reduce the effectiveness and operator satisfaction with prior articulation steering vehicles. Other noteworthy problems may also exist; however, those presented above should be sufficient to demonstrate that offroad agricultural vehicles appearing in the past will admit to worthwhile improvement.

OBJECTS and BRIEF SUMMARY OF THE INVENTION

Objects

It is therefore a general object of the invention to provide an offroad agricultural vehicle with articulated steering which will obviate or minimize difficulties of the type previously described.

It is a specific object of the invention to provide an offroad agricultural vehicle whereby the rear wheels will follow in the tracks of the front wheels upon a turning.

It it still another object of the invention to provide an offroad agricultural vehicle with articulated steering which may compensate for and adaptively operate while traversing uneven ground surfaces It is a further object of the invention to provide an offroad agricultural vehicle with articulated steering which may be facilely steered by an operator.

It is yet a further object of the invention to provide an offroad agricultural vehicle which is basic in structural design and therefore inexpensive to manufacture and maintain.

It is yet another object of the invention to provide an offroad agricultural vehicle which has a high clearance carriage and is usable in a variety of crop fields.

Brief Summary of a Preferred Embodiment of the Invention

A preferred embodiment of the invention which is intended to accomplish at least some of the foregoing objects includes a first frame having two load bearing and drive wheels which are mounted upon an axle which is fixed with respect to the first frame. A second frame has two load bearing drive wheels which are mounted upon an axle which is also fixed with respect to the second frame.

The first and second frames are connected at a universal pivot bearing which permits lateral relative pivoting between the two frames. The first frame has a beam which extends through and beyond the universal pivot bearing so that a crossbeam extends across the two frames. The second frame includes an arcuate rack which has a plurality of sequential drive transferring teeth. A pinion gear which has a plurality of teeth operable to mesh with teeth of the arcuate rack is connected to a distal end of the crossbeam of the first frame. The pinion is rotated by a hydraulic motor, which is responsive to a drive arcuated steering assembly so that movement of the pinion along the arcuate rack effects relative pivoting of the two frames about the universal pivot hearing. Pivoting of the two frames relative to each other moves the frames across a surface which the offroad agricultural vehicle is traversing, thereby effecting steering.

The pinion gear is maintained in engagement with the arcuate rack by a spring loaded roller assembly. The roller assembly insures that when the vehicle is traversing an uneven ground surface, the pinion gear is biased into engagement with the arcuate rack.

A steering assembly is connected to the first frame for enabling an operator to direct and steer the offroad agricultural vehicle.

THE DRAWINGS

Other objects and advantages of the present invention will become apparent from the following detailed description of a preferred embodiment thereof taken in conjunction with the accompanying drawings, wherein.

DETAILED DESCRIPTION

Figure 1:
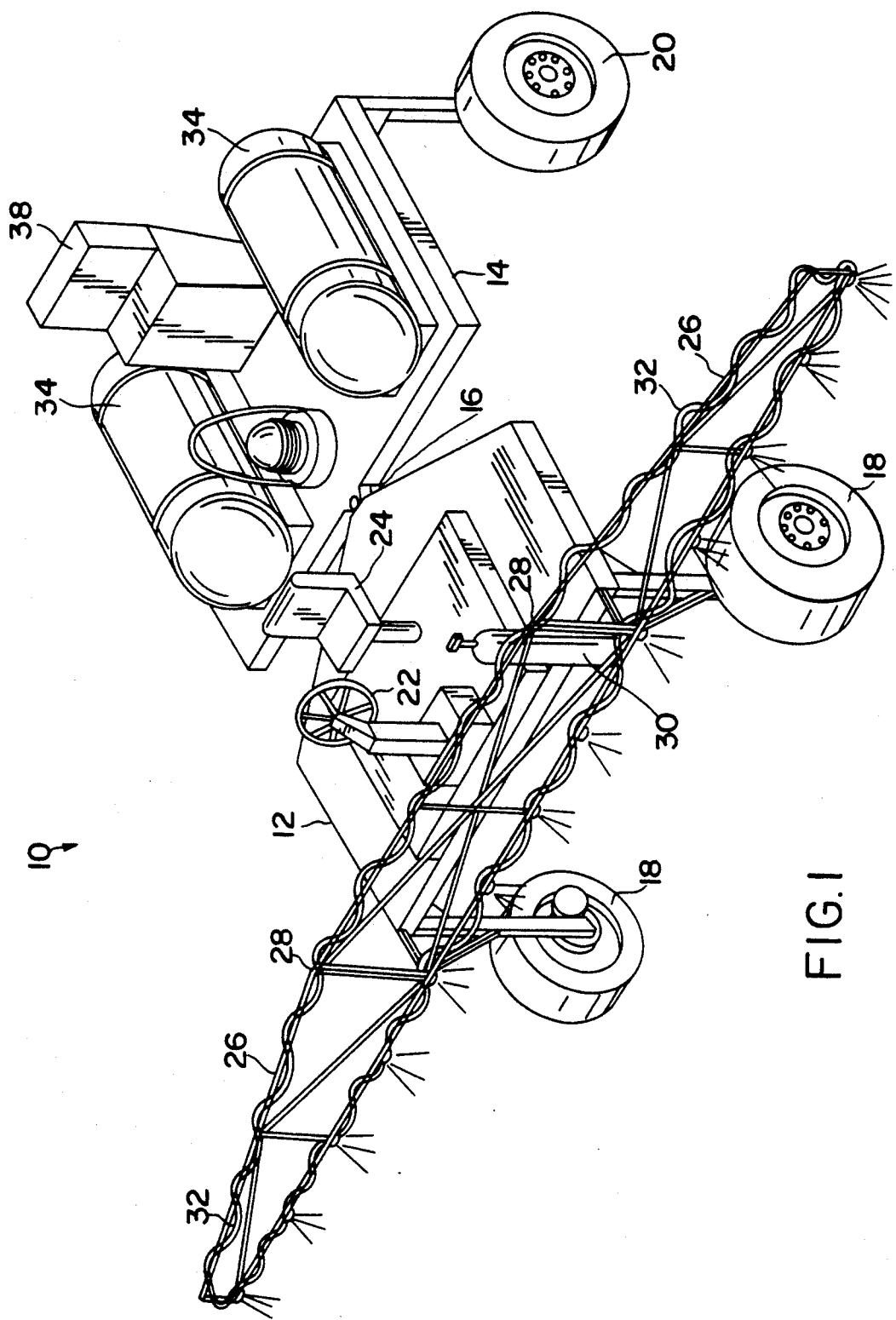
FIG. 1 is an axonometric view of the subject invention and discloses first and second frames connected at a universal pivot bearing for permitting lateral pivoting of the two frames relative to one another.

Referring now to the drawings, wherein like numerals indicate like parts, and initially to FIG. 1, there will be seen an axonometric view of the subject invention. More particularly, an offroad agricultural vehicle 10 includes a first frame 12 connected to a second frame 14 at a universal pivot bearing 16.

Connected to the first frame 12 are two load bearing, ground engaging, drive wheels 18. These wheels have an axis of rotation substantially parallel to a ground surface which the offroad agricultural vehicle 10 is traversing and the wheels do not angularly pivot with respect to this axis. The second frame 14 includes two load bearing, ground engaging, follower wheels 20 (one wheel is shown) which also have an axis of rotation substantially parallel to the ground surface being traversed. The follower wheels 20 do not angularly pivot with respect to their axis of rotation.

The first frame 12 includes a steering wheel 22 connected to a steering assembly (not shown) and an operator seat 24. Booms 26 are connected to the first frame 12 and operably pivot about hinges 28 to operably fold across one another in the front of the first frame 12 or laterally extend when in use. An engine driven pump provides pressure to the composition that is being sprayed from the hose line 32. A lower portion of the hose line 32 has a plurality of nozzles, insecticide, fertilizer, etc. which permit the composition to be sprayed upon foliage or a ground surface.

The second frame 14 includes two tanks 34 which contain a composition, such as insecticide or fertilizer, to be sprayed. A conduit (not shown) connects the tanks 34 to the hose line 32 so that insecticide or the like may be sprayed across a field which the offroad agricultural vehicle 10 is traversing. A motor and control system 38 may include a diesel or internal combustion engine to drive a hydraulic system which actuates rotation of the drive wheels 18 and 20 and selective rotation of the first frame 12 relative to the second frame 14.

Figure 2:
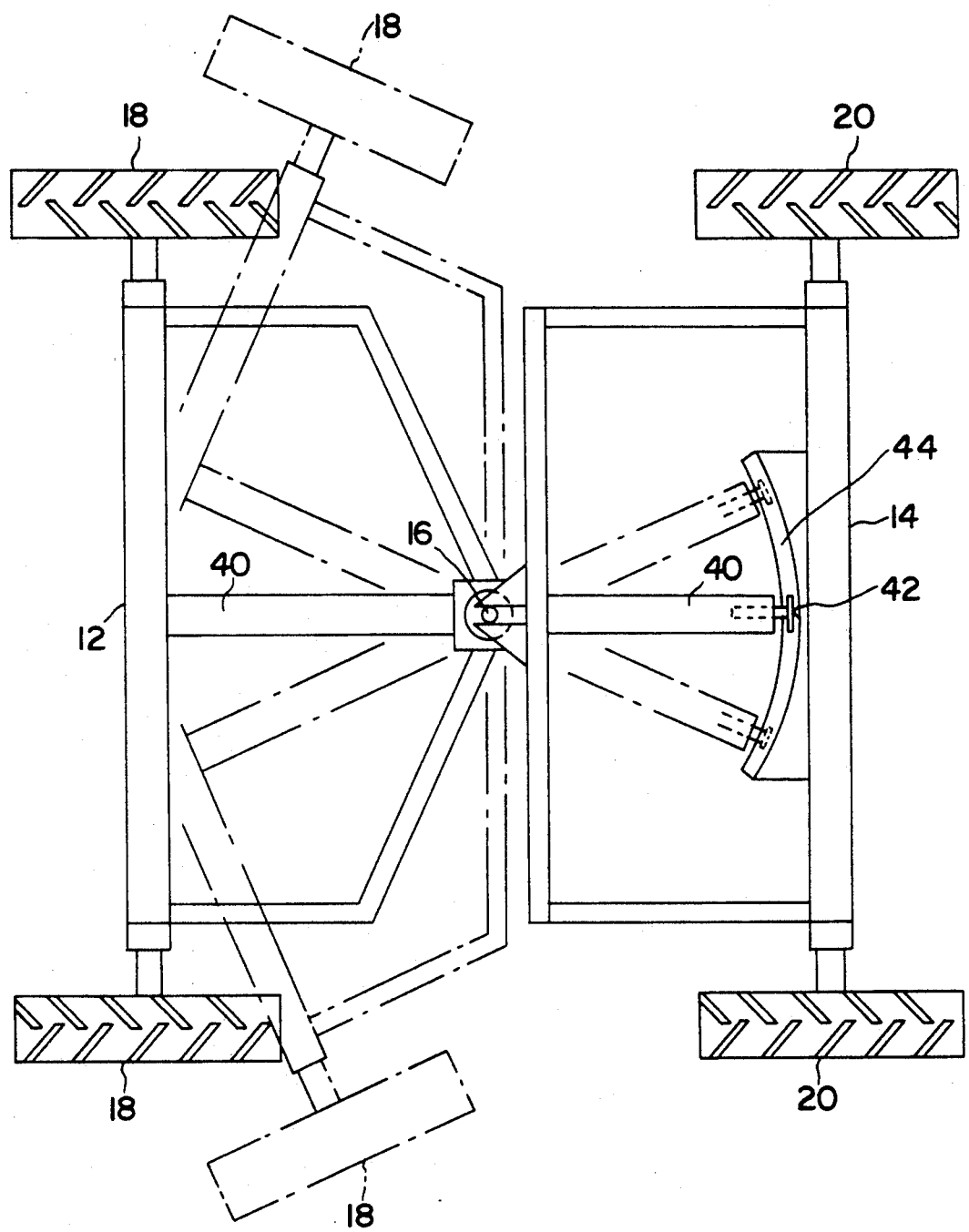
FIG. 2 is a schematic plan view of the subject offroad agricultural vehicle and illustrates the relative pivoting of the two frames to effect steering of the vehicle.

Referring particularly to FIG. 2, there will be seen a plan view of the subject offroad agricultural vehicle 10. The first frame 12 includes a crossbeam 40 which extends through an imaginary vertical axis of the pivot bearing 16 and further extends across the second frame 14 so that the beam is substantially horizontally parallel to the second frame 14. As seen in the embodiment of the subject invention as shown in FIG. 2, a pinion gear 42 is attached to a distal end of the crossbeam 40. The pinion gear is operably engaged with an arcuate rack 44, which is connected to the second frame 14 in the embodiment shown.

When it is desired to steer the vehicle, the pinion gear 42 is rotated along the arcuate rack 44. As a result, the crossbeam 40 pivots about the pivot bearing 16 so that the first frame 12 pivots with respect to the second frame 14. FIG. 2 discloses phantom positions of two limit positions of the first frame 12 and associated crossbeam 40 when the pinion gear 42 is at opposite locations on the arcuate rack 44. The relative pivoting motion between the first 12 and second 14 frames effects a steering motion so that the wheels 18 and 20 traverse coincident surfaces.

Figure 3:
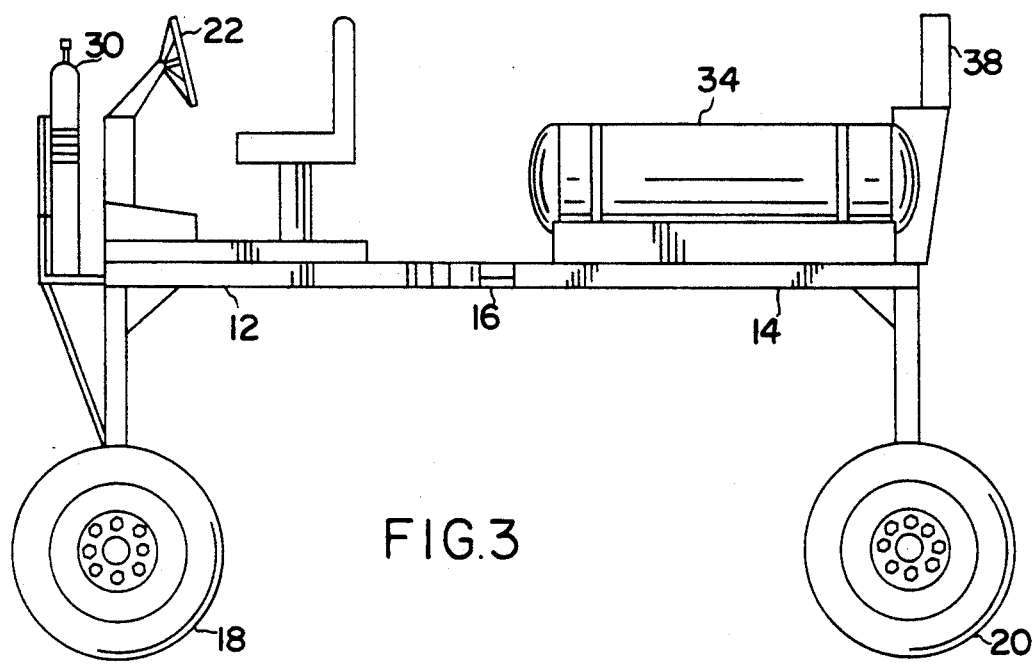
FIG. 3 is a side elevational view of the subject offroad agricultural vehicle.

FIG. 3 is a side elevational view of the offroad agricultural vehicle 10 and illustrates the horizontally coplanar positioning of first 12 and second 14 frames.

Figure 4:
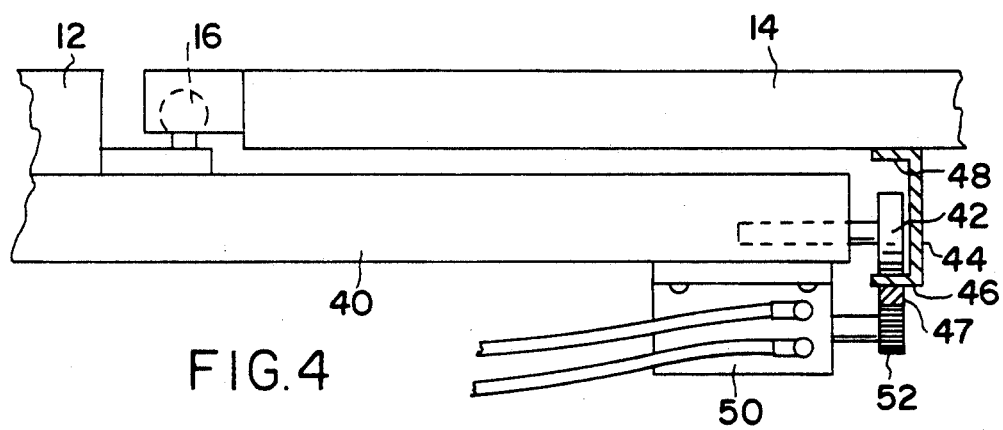
FIG. 4 is a detailed side elevational view of the universal pivot bearing and an arcuate rack and pinion gear assembly.

FIG. 4 is a detailed side elevational view of an arcuate rack 44 and pinion gear 42. The arcuate rack 44 is generally C-shaped in cross-section, as shown, and has lower 46 and upper 48 arms or rails. The arcuate rack 44 is connected at the upper arm 48 to the second frame 14. The arcuate rack 44 has a plurality of sequential drive transferring teeth 47 mounted upon an underside surface of lower arm 46. A support roller 42 is connected to crossbeam 40 and is supported upon an upper surface of the lower arm 46.

A hydraulically driven motor 50 is connected to the underside of crossbeam 40. Connected to motor 50 is a pinion gear 52 which has a plurality of teeth operable to drivingly mesh with the drive transferring teeth 47 of lower arm 46 of the arcuate rack 44. The pinion gear 52 is maintained in engagement with the drive transferring teeth 47 of lower leg 46 by the support roller 42, which utilizes the weight of first frame 12 to maintain engagement of the support roller 42 with arcuate rack 44. The motor 50 operably controls the direction of rotation of pinion gear 52 so that the distal end of the crossbeam 40 will swing along the arcuate rack 44, thereby pivoting first frame 12 relative to second frame 14. Hydraulic lines 53 are connected to a hydraulic system which translates an operator's steering command via steering wheel 22 into a corresponding direction of rotation of pinion gear 52.

Also illustrated in more detail in FIG. 4 is the universal pivot bearing 16. The universal pivot bearing 16 preferably has an associated set of low-friction bearings to facilitate rotation of the two frames 12 and 14. Use of low-friction bearings minimizes any binding at the universal pivot bearing 16 due a large load which the first 12 and second 14 frames may impart to the pivot point.

Figure 5:
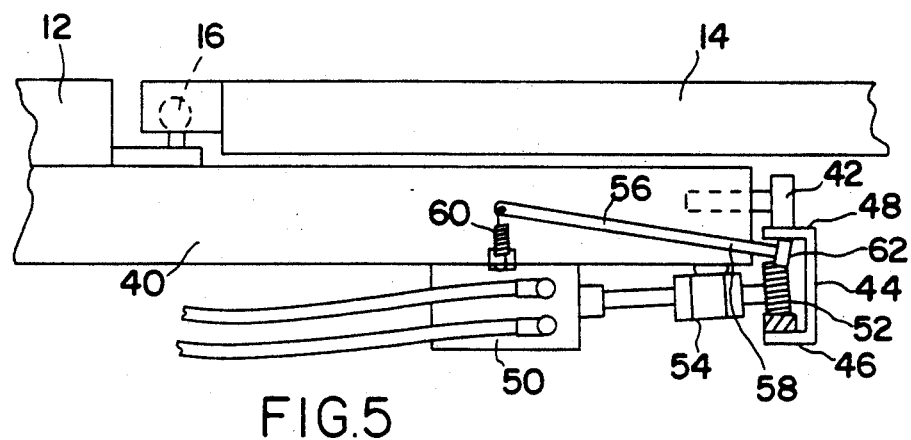
FIG. 5 is a another detailed side elevational view of the universal pivot bearing and an arcuate rack and pinion gear assembly in accordance with a preferred embodiment of the subject invention.

FIG. 5 illustrates another preferred embodiment of a rack and pinion gear assembly. More specifically, shown, as before, is an arcuate rack 44 including lower 46 and upper 48 arms. An inside portion of lower arm 46 of the arcuate rack 44 is fashioned with a plurality of sequential drive transferring teeth. A hydraulically driven motor 50 is connected to crossbeam 40. The motor 50 is connected to and drives pinion gear 52, which is releasably connected in a drive shaft 54 welded or releasably mounted upon crossbeam 40.

An engagement assembly includes two spring biased rods 56, attached to opposite sides of crossbeam 40, and a support roller 42. Rods 56 (only one rod is shown in FIG. 5) are pivotally mounted to crossbeam 40 at a hinge 58. The rod 56 is connected to a spring 60 at one end and has a biasing roller 62 attached to the rod 56 at its other end. The support roller 42 and biasing roller 62 operably roll along the upper arm 48 of arcuate rack 44 as the pinion gear 52 meshes with the drive transferring teeth of lower leg 46. When the offroad agricultural vehicle 10 is traversing uneven ground, the spring 60 biases the rods 56 so that the biasing roller 62 will encourage the support roller to remain juxtaposed with the upper leg 48 of arcuate rack 44. In this configuration, the continuous positioning of support roller 42 on upper arm 48 maintains engagement of pinion gear 52 with the drive transferring teeth on the lower leg 46 of arcuate rack 44.

Figure 6:
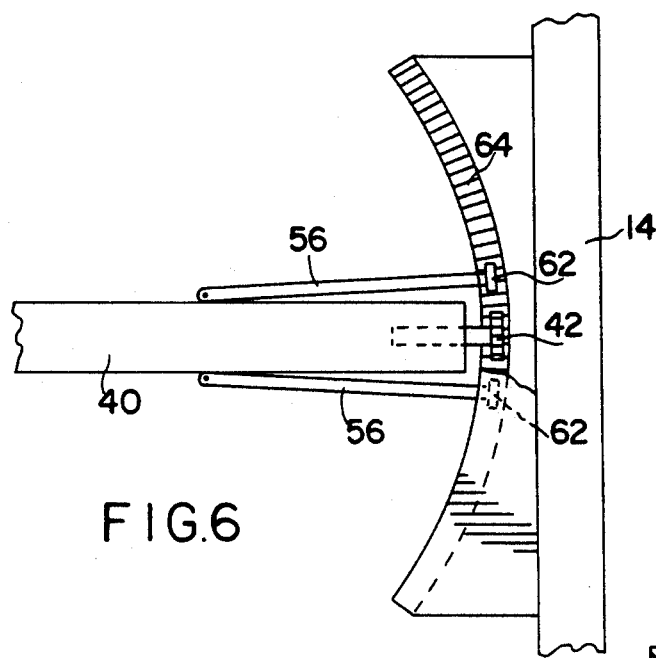
FIG. 6 is a detailed plan view of another arcuate rack and pinion gear assembly.

FIG. 6 is a plan view of the arcuate rack and pinion gear assembly as depicted in FIG. 5 and illustrates the positioning of rods 56. The pinion gear 52 meshes with the drive transferring teeth 64 of arcuate rack 44 so that when the pinion gear 44 rotates, the crossbeam 40 will pivot about universal pivot bearing 16.

Figure 7:
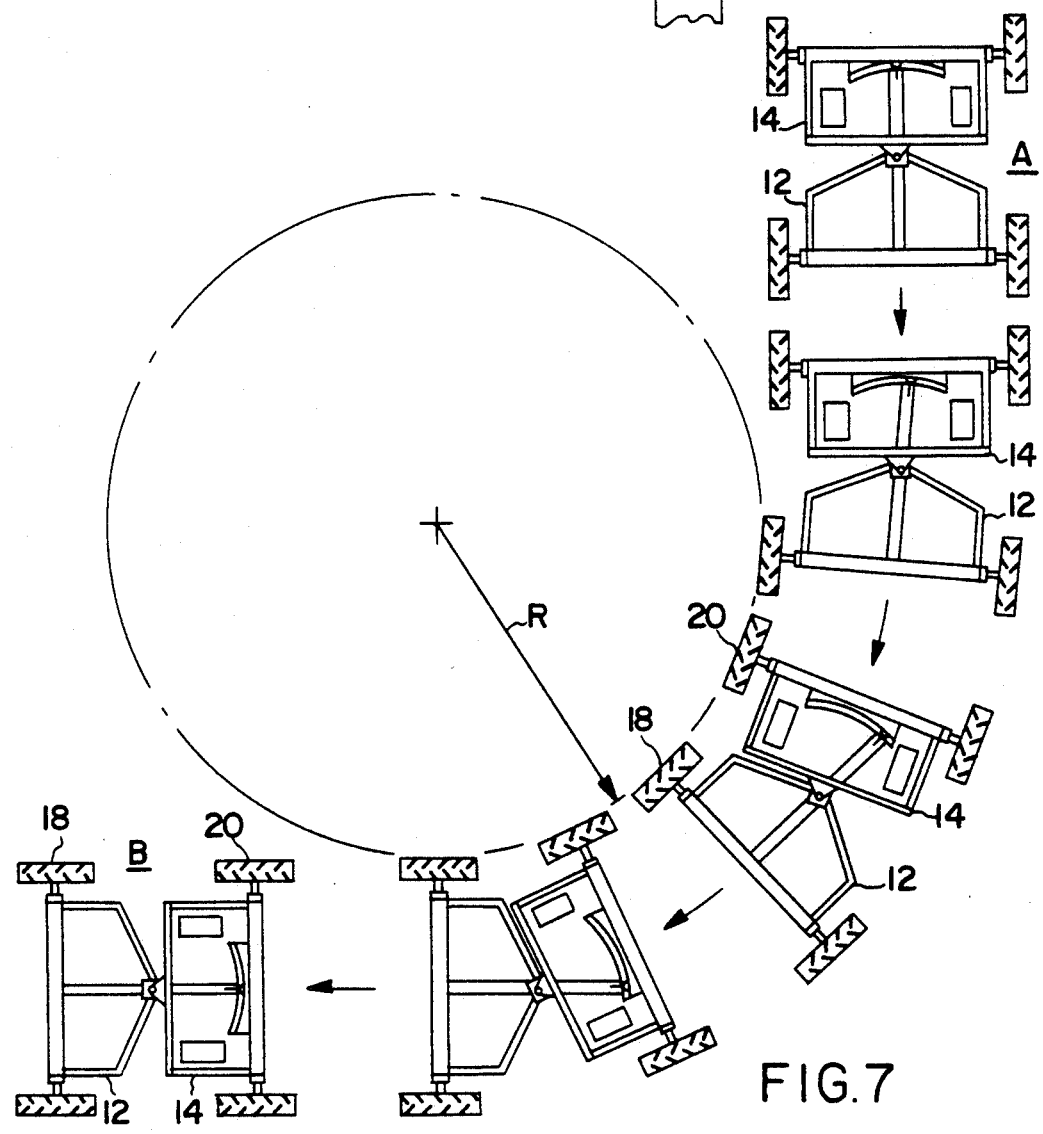
FIG. 7 is a schematic view of a turning sequence of the subject offroad agricultural vehicle and depicts the relative positioning of the two frames at different intervals during a turning operation.

FIG. 7 is a turning sequence illustrating the relative positioning of first 12 and second 14 frames of offroad agricultural vehicle 10. At position "A", the crossbeam 40 is located at the center of arcuate rack 44. When the operator turns the steering wheel 22, the first frame 12 begins to pivot as the pinion gear 52 moves along the arcuate rack 44. The pinion gear 52 continues to move the crossbeam 40 and first frame 12 relative to second frame 14 so that the surfaces traversed by drive 18 and follower 20 wheels are coincident on respective sides of the offroad agricultural vehicle 10. As the turning motion is completed, the crossbeam 40 and associated pinion gear 52 return to the center of arcuate rack 44 as shown at position "B".

The vehicle has thereby completed a right angle right turn about a turn radius "R" wherein the rear drive wheel 20 have traversed the same surface as the forward pushed wheel 18.

SUMMARY OF MAJOR ADVANTAGES OF THE INVENTION

After reading and understanding the foregoing inventive balanced skeletal traction apparatus, in conjunction with the drawings, it will be appreciated that several distinct advantages of the subject invention are obtained. Without attempting to set forth all of the desirable features of the instant offroad agricultural vehicle with articulated steering, at least some of the major advantages include the novel application of a single pivot bearing 16 between a pair of frames 12 and 14. The arcuate rack and hydraulicly driven pinion enables the offroad vehicle to be selectively steered and the wheels will traverse an identical path.

The single pivot 16 and biased follower members 56 enable the front and rear frames to traverse uneven terrain while maintaining steering engagement of the rack and pinion steering assemblies.

Further, the elevated frame units 12 and 14 permit the subject offroad vehicle to be used to treat crop fields with a variety of clearance heights. Moreover, the subject articulated steering enables turning without creating four tracks through a crop field.

Still further, the subject articulated, single pivot 16, offroad vehicle is rather basic in component design which admits to ease in fabrication and repair.

In describing the invention, reference has been made to preferred embodiments and illustrative advantages of the invention. Those skilled in the art, however, and familiar with the instant disclosure of the subject invention, may recognize additions, deletions, modifications, substitutions and other changes which will fall within the purview of the subject invention and claims.

What is claimed is:

1. An offroad agricultural vehicle comprising:
   a first frame having at least one load bearing, ground engaging wheel, said at least one wheel having an axis of rotation substantially parallel to a ground surface and said axis being essentially fixed with respect to said first frame;
   a second frame having at least one load bearing, ground engaging wheel, said at least one wheel having an axis of rotation substantially parallel to a ground surface and said axis being essentially fixed with respect to said second frame;
   drive means which operably effect rotation of at least one of said at least one load bearing, ground engaging wheel of said first frame and said at least one load bearing, ground engaging wheel of said second frame to thereby provide drive to said offroad agricultural vehicle;
   a universal pivot bearing positioned between and at a juncture of said first and said second frames which operably permits lateral relative pivoting motion between said first and said second frame and further operably accommodates a degree of vertical disparity between said at least one wheel connected to said first frame and said at least one wheel connected to said second frame with respect to a surface traversed by said offroad agricultural vehicle;
   steering means for enabling an operator to direct and steer said offroad agricultural vehicle, said steering means including,
      an arcuate rack connected to one of said first and said second frames and having a plurality of sequential drive transferring teeth;
      a pinion gear connected to the other of said first and said second frames with respect to said arcuate rack and having a plurality of teeth operable to drivingly mesh with the drive transferring teeth of said arcuate rack;
      means for maintaining engagement of said pinion gear with said arcuate rack as said offroad agricultural vehicle traverses an uneven ground surface; and
      means for driving said pinion gear being connected to said pinion gear and the other of said first and said second frames, said means for driving said pinion gear comprising a motor connected to one of said first or said second frames which effects rotation of said pinion gear in two opposing directions, thereby imparting lateral movement of said first frame with respect to said second frame, such that an operator of said offroad agricultural vehicle may selectively steer and thereby effect relative pivoting of said first frame and said second frame.

2. An offroad agricultural vehicle as defined in claim 1, wherein said motor comprises:
   a hydraulically driven motor.

3. An offroad agricultural vehicle as defined in claim 2, wherein said first frame further comprises:
   a beam extending through a vertical axis of and beyond said pivot bearing and further extending across said second frame so that said beam is substantially horizontally parallel to said second frame.

4. An offroad agricultural vehicle as defined in claim 3, wherein said arcuate rack: is C-shaped in cross section, and including, a first horizontal arm substantially parallel with and connected to one of said first or said second frames, a substantially vertical side connected to said first horizontal arm on one side, and a second horizontal arm substantially parallel to said first horizontal arm and connected to said substantially vertical side on a side opposite that connected to said first horizontal arm.

5. An offroad agricultural vehicle as defined in claim 4, wherein said means for maintaining engagement of said pinion gear with said arcuate rack comprises:

a support roller connected to a distal end of said beam of said first frame and lying on an upper outside surface of said arcuate rack and which operably supports said first frame on said second frame and permits lateral relative pivoting of said first frame and said second frame; and at least one rod pivotally connected to said beam of said first frame and having a roller on a distal end which operably rolls along said first horizontal arm of said arcuate rack, and spring means operably connected to the other end of said at least one rod for biasing said support roller into engagement with said second horizontal arm for operably maintaining engagement of said pinion gear with said arcuate rack.

6. An offroad agricultural vehicle as defined in claim 3, wherein said means for maintaining engagement of said pinion gear with said arcuate rack comprise:

a support roller connected to the distal end of said beam of said first frame and lying on an upper inside surface of an arm of said arcuate rack and which operably supports said first frame on said second frame and permits lateral relative pivoting of said first and said second frames, wherein said pinion gear is on a lower outside surface of an arm of said arcuate rack and engages with said arcuate rack so that said support roller and said pinion gear engage with said arcuate rack.

7. An offroad agricultural vehicle as defined in claim 1, wherein:

said at least one load bearing, ground engaging wheel of said first frame includes two load bearing, ground engaging wheels which are parallel to each other; and said at least one load bearing, ground engaging wheel of said second frame comprises two load bearing, ground engaging wheels which are parallel to each other so that a lateral relative pivoting motion of said first and said second frames is such that the surfaces traversed by said wheels of said second frame will be coincident with the surfaces traversed by said wheels of said first frame of said offroad agricultural vehicle.

8. An offroad agricultural vehicle as defined in claim 1, wherein:

said arcuate rack is symmetrically positioned with respect to said universal pivot bearing so that said universal pivot bearing lies on a radius of curvature of said arcuate rack, taken at a mid point thereof, extending through said universal pivot bearing.

9. An offroad agricultural vehicle comprising:

a first frame having at least one load bearing, ground engaging wheel, said at least one wheel having an axis of rotation substantially parallel to a ground surface and said axis being essentially fixed with respect to said first frame;

a second frame having at least one load bearing, ground engaging wheel, said at least one wheel having an axis of rotation substantially parallel to a ground surface and said axis being essentially fixed with respect to said second frame;

drive means which operably effect rotation of said at least one load bearing, ground engaging wheel of at least one of said first frame and said second frame to thereby provide drive to said offroad agricultural vehicle;

a universal pivot bearing positioned between and at a juncture of said first and said second frames which operably permits lateral relative pivoting motion between said first and said second frame and further operably accommodates a degree of vertical disparity between said at least one wheel connected to said first frame and said at least one wheel connected to said second frame with respect to a surface traversed by said offroad agricultural vehicle;

steering means connected to said first frame for enabling an operator to direct and steer said offroad agricultural vehicle, said steering means including, an arcuate rack connected to one of said first and said second frames and having a plurality of sequential drive transferring teeth;

a pinion gear connected to the other of said first and said second frames with respect to said arcuate rack and having a plurality of teeth operable to drivingly mesh with the drive transferring teeth of said arcuate rack;

means for maintaining engagement of said pinion gear with said arcuate rack as said offroad agricultural vehicle traverses an uneven ground surface;

means for driving said pinion gear connected to said pinion gear and the other of said first and said second frames, said means for driving said pinion gear being responsive to said steering means, such that an operator of said offroad agricultural vehicle may selectively steer and thereby effect relative pivoting of said first frame and said second frame;

said arcuate rack being C-shaped in cross section, including, a first horizontal arm substantially parallel with and connected to one of said first or said second frames, a substantially vertical side connected to said first horizontal arm on one side, and a second horizontal arm substantially parallel to said first horizontal arm and connected to said substantailly vertical side on a side opposite that connected to said first horizontal arm;

a support roller connected to a distal end of said beam of said first frame and lying on an upper outside surface of said arcuate rack and which operably supports said first frame on said second frame and permits lateral relative pivoting of said first frame and said second frame; and at least one rod pivotally connected to said beam of said first frame and having a roller on a distal end which operably rolls along said first horizontal arm of said arcuate rack, and spring means operably connected to the other end of said at least one rod for biasing said support roller into engagement with said second horizontal arm for operably maintaining engagement of said pinion gear with said arcuate rack.

10. An offroad agricultural vehicle as defined in claim 9, wherein:
said arcuate rack is symmetrically positioned with respect to said universal pivot bearing so that said universal pivot bearing lies on a radius of curvature of said arcuate rack, taken at a mid-point thereof, extending through said universal pivot bearing.

11. An offroad agricultural vehicle comprising:
a first frame having at least one load bearing, ground engaging wheel, said at least one wheel having an axis of rotation substantially parallel to a ground surface and said axis being essentially fixed with respect to said first frame;
a second frame having at least one load bearing, ground engaging wheel, said at least one wheel having an axis of rotation substantially parallel to a ground surface and said axis being essentially fixed with respect to said second frame;
drive means which operably effect rotation of said at least one load bearing, ground engaging wheel of said first frame and said at least one load bearing, ground engaging wheel of said second frame to thereby provide drive to said offroad agricultural vehicle;
a universal pivot bearing positioned between and at a juncture of said first and said second frames which operably permits lateral relative pivoting motion between said first and said second frames and further operably accommodates a degree of vertical disparity between said at least one wheel connected to said first frame and said at least one wheel connected to said second frame with respect to a surface traversed by said offroad agricultural vehicle;
steering means connected to said first frame for enabling an operator to direct and steer said offroad agricultural vehicle, said steering means including,
an arcuate rack connected to one of said first and said second frames and having a plurality of sequential drive transferring teeth, wherein said arcuate rack is symmetrically positioned with respect to said universal pivot bearing so that said universal pivot bearing lies on a radius of curvature of said arcuate rack, taken at a mid point thereof, extending through said universal pivot bearing;
a pinion gear connected to the other of said first and said second frames with respect to said arcuate rack and having a plurality of teeth operable to drivingly mesh with the drive transferring teeth of said arcuate rack;
a beam extending through a vertical axis of and beyond said pivot bearing and further extending across said second frame so that said beam is substantially horizontally parallel to said second frame;
means for maintaining engagement of said pinion gear with said arcuate rack as said offroad agricultural vehicle traverses an uneven ground surface including,
a support roller connected to the distal end of said beam of said first frame and lying on an upper inside surface of an arm of said arcuate rack and which operably supports said first frame on said second frame and permits lateral relative pivoting of said first and said second frames, wherein said pinion gear lies on a lower outside surface of an arm of said arcuate rack and engages with said arcuate rack so that said support roller and said pinion gear engage with said arcuate rack; and
means for driving said pinion gear being connected to said pinion gear and the other of said first and said second frames such that an operator of said offroad agricultural vehicle may selectively steer and thereby effect relative pivoting of said first frame and said second frame.

* * * * *